United States Patent Office 3,469,196
Patented Sept. 23, 1969

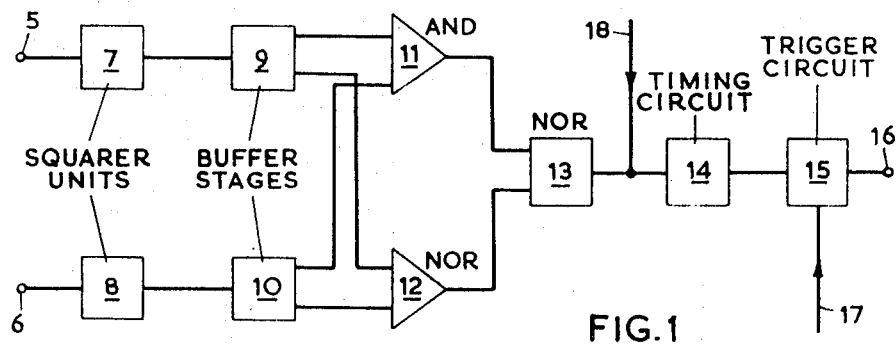
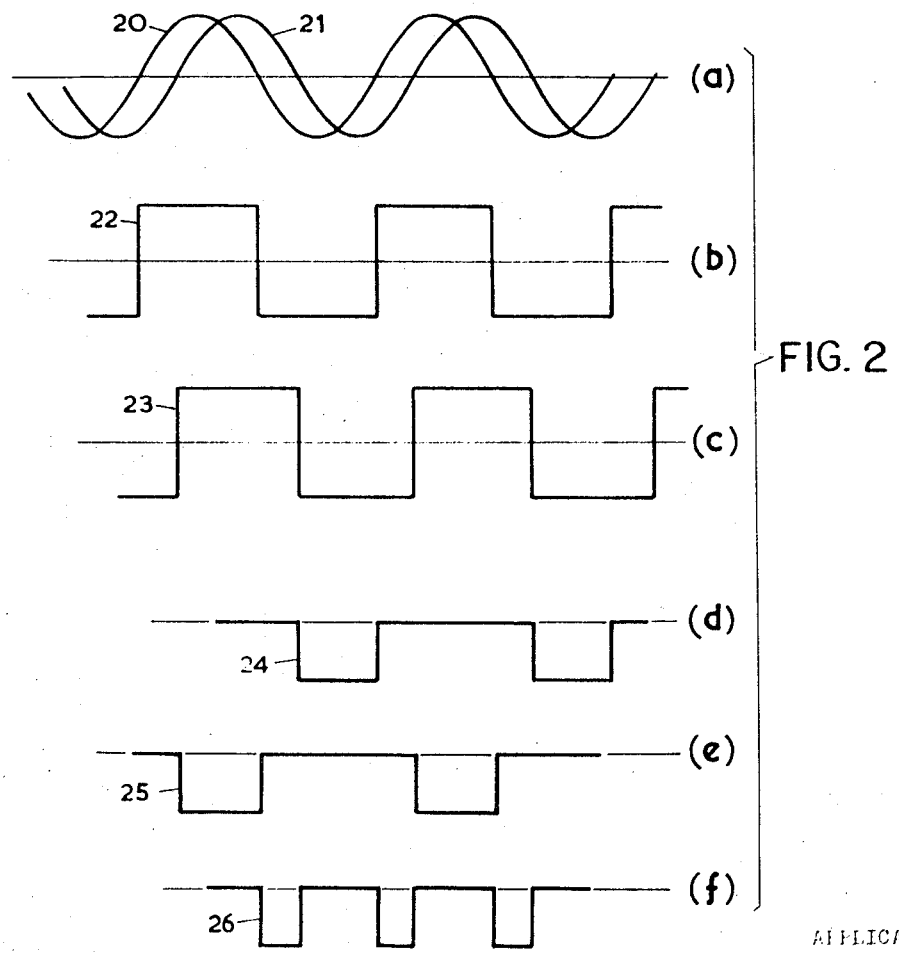

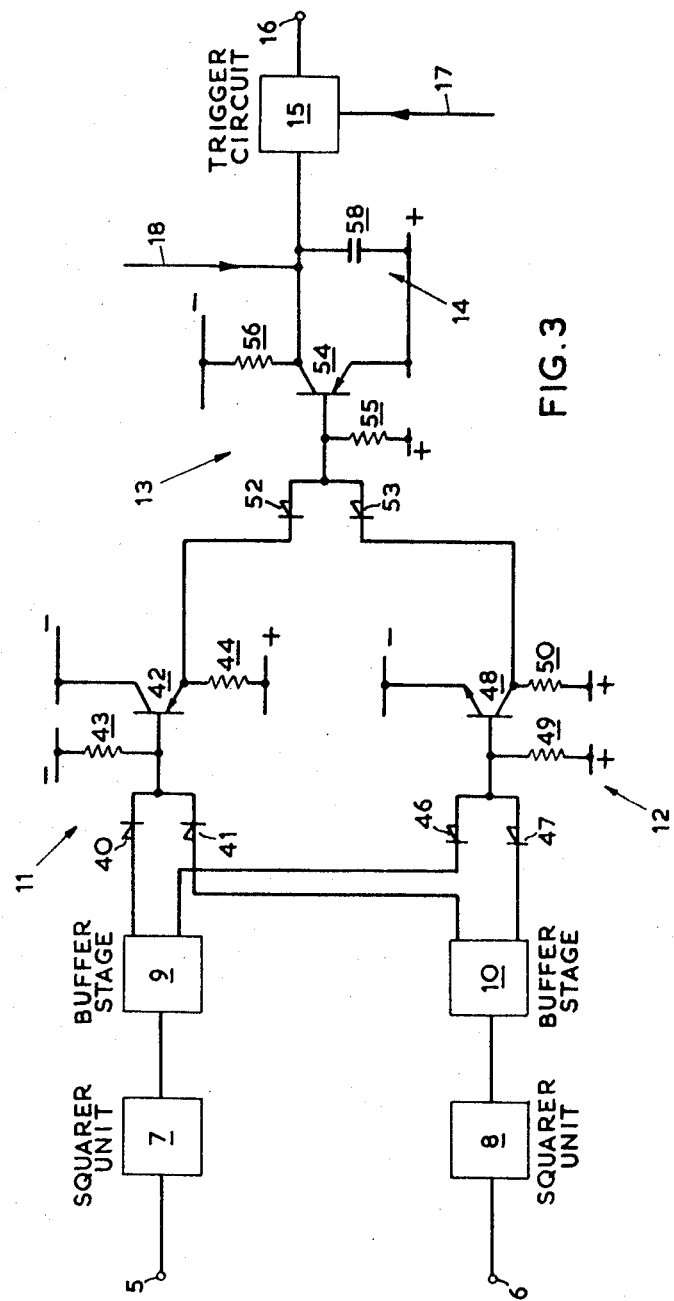

3,469,196
ELECTRICAL SIGNAL PHASE COMPARATOR
William Alan Cowin, Stafford, and Ronald Philip Carter, Bristol, England, assignors to The English Electric Company Limited, London, England, a British company
Filed Mar. 21, 1966, Ser. No. 535,870
Claims priority, application Great Britain, Mar. 22, 1965, 12,077/65
Int. Cl. H03k 5/20
U.S. Cl. 328—133                2 Claims

ABSTRACT OF THE DISCLOSURE

This invention relates to phase comparators for detecting the phase difference between two signals alternating at the same frequency. In particular it includes means for squaring the two signals and first and second gates connected thereto for developing outputs wherever the two signals are simultaneously negative or positive respectively. A further gate develops an output when no output is produced by both the first and second gates. The output of this further gate charges a capacitor so that the charge level of the capacitor is a measure of the phase difference of the two signals. A trigger circuit can be connected to the capacitor to provide a warning signal at a fixed level of charge.

---

This invention relates to phase comparators, and particularly relates to phase comparators for detecting a phase difference between two electrical signals alternating at the same frequency.

The present invention consists in a phase comparator for detecting a phase difference between two signals alternating at the same frequency about a datum, comprising first and second gating circuits each connected to receive the said two signals, the first circuit being operable to develop an output only when both signals are positive with respect to said datum and the second circuit being operable to develop an output only when both signals are negative with respect to said datum, and a third gating circuit connected to the first and second circuits and operable to develop an output only when neither the first nor the second circuit develops its output whereby any said output from the third circuit is indicative of a phase difference between the two signals.

Each of the two signals may be applied to the first and second gating circuits through a squaring circuit, said squaring circuit being operable to develop a square wave from the alternating signal which is symmetrical about said datum and has a mark-space cycle coincident with the positive and negative excursions of said signal.

Preferably, the comparator includes a timing circuit connected to said third gating circuit and operable to determine the period for which said third circuit develops an output whereby to determine the magnitude of the phase difference between the two signals. In addition, a trigger circuit may be connected to the timing circuit which is operable to develop a warning or control signal upon the period exceeding a predetermined magnitude.

A phase comparator according to the invention will now be described, by way of example, with reference to the accompanying drawings in which:

FIG. 1 is a logic diagram of the phase comparator;

FIG. 2 shows waveforms occurring in the phase comparator; and

FIG. 3 is a circuit diagram of part of the comparator.

The phase comparator (FIG. 1) has two input terminals 5 and 6 for receiving two alternating signals, respectively, the phase difference between which is to be detected. Terminal 5 is connected to a squarer unit 7 and terminal 6 is connected to a squarer unit 8, these squarer units acting to convert the alternating signals into square waves of constant amplitude, and incorporating limiter circuits to prevent damage to the equipment if the magnitude of the alternating signals is excessive. The output of each squarer unit is connected to a respective buffer stage 9, 10, each of which produces two outputs similar to its input but isolated from each other. One output from buffer stage 9 is fed to an AND gate 11 whilst the other is fed to a NOR gate 12, and similarly one output of the buffer stage 10 is fed to the AND gate 11 and the other is fed to the NOR gate 12.

The gates 11 and 12 operate on a basis of negative logic, that is, a negative signal is considered to be a "1" and absence of a negative signal is considered to be a "0"; therefore AND gate 11 produces a negative, "1," output only when it receives two negative inputs, and NOR gate 12 produces a negative, "1," output only when it does not receive any negative inputs.

The respective outputs of the gates 11 and 12 are fed to a NOR gate 13 whose output controls a timing circuit 14, this gate 13 also operating on a basis of negative logic similarly to gate 12. The output of the timing circuit 14 operates a bistable trigger circuit 15 connected to an output terminal 16, and this trigger circuit may be reset to its original state, after being triggered, by a signal on a line 17. Operation of the timing circuit 14 is prevented, until required, by a signal on a line 18, which signal may be present until some external condition occurs rendering measurement of the phase difference betwen incoming signals necessary.

The operation of the comparator will now be described with particular reference to FIG. 2. This figure shows at (a) the two A.C. signals 20 and 21 which are respectively fed to the terminals 5 and 6 (FIG. 1). The squarer unit 7 produces from the waveform 20 the square wave 22 shown in (b) in FIG. 2, and the squarer unit 8 produces from the waveform 21 the square wave 23 shown in (c) of FIG. 2.

The two square waves 22 and 23 are fed into the input of the AND gate 11. This AND gate is, as explained, arranged to produce an output only when both its inputs are negative. It therefore produces an output 24 shown in (d) of FIG. 2. The square waves are also fed into the inputs of the NOR gate 12 which, as explained, is arranged to produce an output only when neither of its inputs is negative. It therefore produces an output 25 shown in (e) of FIG. 2.

The waveforms 24 and 25 are fed into the NOR gate 13. This NOR gate is arranged to produce an output only when neither of its inputs is negative. It therefore produces an output 26 shown in (f) in FIG. 2. This output is in the form of a series of pulses and it will be seen that the length of each pulse is equal to the instantaneous phase difference between the waveforms 20 and 21.

Each pulse of waveforms 26 is fed into the timing circuit 14 and activates the circuit, this timing circuit being de-activated at the end of each pulse. If the phase difference between the two waveforms 20 and 21 exceeds the predetermined difference to be detected, then the length or period of the pulse 26 will exceed a corresponding minimum, and since the timing circuit 14 remains activated for the period of this pulse it is arranged to produce an output which is fed to the trigger circuit 15, causing the latter to be switched to a SET state, if this period exceeds the aforesaid minimum. In this SET state, the trigger circuit produces an output at the terminal 16 indicating that the phase difference between the two incoming A.C. signals has exceeded the predetermined value. As mentioned above, the trigger circuit 15 is switched to the opposite, RESET, state by an externally controlled signal on the line 17.

FIG. 3 shows the comparator in greater detail and illustrates the circuits of the gates 11, 12 and 13, and the timing circuit 14.

The AND gate 11 comprises two diodes 40 and 41 connected together and to the base of a p-n-p transistor 42. The transistor has its base connected to a negative pole of a power supply through a resistor 43 and its collector is also connected to a negative pole. The emitter is connected to a positive pole of the power supply through a resistor 44 and the output of the AND gate is taken from the emitter.

The NOR gate 12 comprises two diodes 46 and 47 connected to the base of an n-p-n transistor 48. The base of the transistor 48 is connected to a positive pole of the power supply through a resistor 49, and the emitter is connected to a negative pole of the supply. The collector is connected to a positive pole of the power supply through a resistor 50 and the output of the gate is taken from the collector.

The NOR gate 13 comprises two diodes 52 and 53 connected to the base of a p-n-p transistor 54, the base being connected to a positive pole of the power supply through a resistor 55. The emitter of the transistor is directly connected to a positive pole of the power supply and the collector is connected to a negative pole through a resistor 56. The output of the NOR gate is taken from the collector of the transistor 54.

The timing circuit 14 comprises a capacitor 58 connected to the positive pole of the supply.

The magnitudes of all the positive polarities shown are not necessarily the same, nor are the magnitudes of all the negative polarities.

The operation will now be described. If both inputs to the diodes 40 and 41 in AND gate 11 are negative, transistor 42 conducts producing a negative output to the diode 52. If one or both inputs to the diodes 40 and 41 are positive, transistor 42 is cut off producing a positive output to the diode 52.

If both inputs to the diodes 46 and 47 are positive, transistor 48 conducts producing a negative output to the diode 53. If one or both inputs to the diodes 46 and 47 are negative, transistor 48 is cut off producing a positive output to the diode 53.

From the above it will be seen that AND gate 11 produces a negative output to the diode 52 when its input conditions are satisfied, that is, both its inputs are negative, and otherwise produces a positive output to diode 52. Similarly, NOR gate 12 produces a negative output to diode 53 when its input conditions are satisfied, that is, neither of its inputs is negative, and otherwise produces a positive output to diode 53.

If the inputs to one or both of the diodes 52 and 53 are negative, current conduction through the resistor 55 will produce a voltage drop thereacross and cause transistor 54 to conduct raising its collector potential to a positive value. The capacitor 58 therefore does not charge. If however neither of the inputs to the diodes is negative, transistor 54 is cut off and its collector falls to a negative potential causing the capacitor 58 to charge, assuming of course that there is no positive "inhibit" signal on line 18. When the charge on capacitor 58 has reached such a level as to indicate that the phase difference between the two A.C. waveforms has exceeded the predetermined magnitude, the trigger circuit will be switched to the SET state producing the aforementioned warning indication at terminal 16.

The comparator described may be used with the timing circuit 14, the trigger circuit 15 and the line 18 omitted, the terminal 16 being connected directly to the output of the NOR gate 13. The comparator then produces an output at the terminal 16 immediately any phase difference between the two incoming A.C. signals occurs.

We claim:
1. A phase comparator for detecting a phase difference between two signals alternating at the same frequency about a datum, comprising
   first and second squaring circuits for respectively receiving the two signals and developing square waves therefrom which are symmetrical about said datum and have a mark-space cycle coincident with the positive and negative excursions of said signal,
   first and second gating circuits,
   means for applying the square waves from both the first and second squaring circuits to each of said gating circuits, the first gating circuit being operable to develop an output of one polarity only when both square wave signals are positive with respect to said datum and the second gating circuit being operable to develop an output of the said one polarity only when both signals are negative with respect to said datum,
   a third gating circuit connected to the first and second circuits and operable to develop an output only when neither the first nor the second circuit develops its output whereby any said output from the third circuit is indicative of a phase difference between the two signals, and
   a timing circuit connected to said third gating circuit, said timing circuit including
   a capacitor chargeable by the output from the third gating circuit, the level of charge on the capacitor being dependent upon the period for which the third gating circuit develops the output signal whereby to determine the magnitude of the phase difference between the two signals.
2. A phase comparator according to claim 1, comprising a trigger circuit connected to said timing circuit and operable to develop a warning or control signal upon said period exceeding a predetermined magnitude.

References Cited

UNITED STATES PATENTS

| | | | |
|---|---|---|---|
| 2,844,721 | 7/1958 | Minkow | 324—82 |
| 2,892,099 | 6/1959 | Gray | 307—216 |
| 2,923,820 | 2/1960 | Liguori et al. | 324—82 |
| 3,054,062 | 9/1962 | Vonarburg | 307—232 |
| 3,107,306 | 10/1963 | Dobbie | 307—216 |
| 3,278,758 | 10/1966 | Vroman | 307—216 |
| 3,283,174 | 11/1966 | Baude | 324—87 |
| 3,304,496 | 2/1967 | Lorenz | 324—87 |

ARTHUR GAUSS, Primary Examiner

H. A. DIXON, Assistant Examiner

U.S. Cl. X.R.

307—215, 295